United States Patent
Ohrbom et al.

[11] Patent Number: 6,165,618
[45] Date of Patent: *Dec. 26, 2000

[54] CURABLE COATING COMPOSITIONS CONTAINING CARBAMATE RESIN AND ADDITIVES

[75] Inventors: Walter H. Ohrbom, Commerce; Gregory G. Menovcik, Farmington Hills; John W. Rehfuss, West Bloomfield; Robert J. Taylor, Northville, all of Mich.

[73] Assignee: BASF Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/333,804

[22] Filed: Nov. 3, 1994

[51] Int. Cl.$^7$ .............................. B32B 27/40; B32B 27/42; C07C 271/62

[52] U.S. Cl. .................................... 428/423.1; 427/372.2; 427/384; 427/385.5; 525/123; 525/124; 525/127; 525/131; 525/154; 525/157; 525/440; 525/457; 525/453; 525/456; 525/459; 525/501

[58] Field of Search ...................... 525/440, 452, 525/453, 456, 459, 509, 123, 124, 127, 131, 154, 157; 427/372.2, 384, 385.5; 428/423.1

[56] References Cited

U.S. PATENT DOCUMENTS

| | | | |
|---|---|---|---|
| 2,979,514 | 4/1961 | O'Brien et al. | 260/34.2 |
| 3,464,938 | 9/1969 | Nordstrom | 525/159 |
| 3,479,328 | 11/1969 | Norstrom | 260/86.1 |
| 3,674,838 | 7/1972 | Norstrom | 260/482 |
| 4,126,747 | 11/1978 | Cowhead, III et al. | 520/166 |
| 4,279,833 | 7/1981 | Culberton et al. | 260/464 |
| 4,340,497 | 7/1982 | Knopf | 252/188.3 R |
| 4,677,168 | 6/1987 | Hoy et al. | 525/441 |
| 4,758,632 | 7/1988 | Parekh et al. | 525/383 |
| 4,814,382 | 3/1989 | Hoy et al. | 525/113 |
| 5,098,947 | 3/1992 | Metzger et al. | 524/507 |
| 5,115,015 | 5/1992 | Richey, Jr. et al. | 524/507 |
| 5,134,205 | 7/1992 | Blank | 525/509 |
| 5,158,808 | 10/1992 | Hoy et al. | 427/385.5 |
| 5,336,566 | 8/1994 | Rehfuss | 428/524 |
| 5,356,669 | 10/1994 | Rehfuss et al. | 427/407.1 |
| 5,552,497 | 9/1996 | Taylor et al. | 525/456 |
| 5,744,550 | 4/1998 | Menovcik et al. | 525/162 |

FOREIGN PATENT DOCUMENTS

| | | |
|---|---|---|
| WO87/00851 | 2/1987 | European Pat. Off. . |
| WO 94/10211 | 5/1994 | European Pat. Off. . |
| WO 94/10212 | 5/1994 | European Pat. Off. . |
| WO 94/10213 | 5/1994 | European Pat. Off. . |

OTHER PUBLICATIONS

DE 39 33 890 A1 "Process for the preparation of modified polyesters and their use", Oct. 11, 1989.
DE 38 11 497 A1, Coating Compositions, Apr. 06, 1988.
DE 39 29 697 A1, "Coating Compositions", Sep. 07, 1989 3634780 a Description.

*Primary Examiner*—Paul Thibodeau
*Assistant Examiner*—D Lawrence Tarazano
*Attorney, Agent, or Firm*—Mary E. Golota

[57] ABSTRACT

Curable coating compositions are described comprising
(a) a polymer resin comprising carbamate functional groups,
(b) a curing agent having groups that are reactive with said functional groups on (a), and
(c) a compound having a molecular weight of from 75 to 2000 comprising at least one group of the formula:

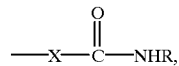

wherein X is O or NH, R is H or alkyl of 1 to 4 carbon atoms, and either (a), (b), or both (a) and (b) comprise groups that are reactive with said group on (c).

31 Claims, No Drawings

CURABLE COATING COMPOSITIONS CONTAINING CARBAMATE RESIN AND ADDITIVES

FIELD OF THE INVENTION

This invention relates to coating compositions, especially compositions for high-gloss topcoats, and more especially the clearcoat of color-plus-clear composite coatings.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberations at the surface of the coating in order to achieve the desired visual effect such as high distinctness of image (DOI).

As such, these coatings are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings such as the clearcoat of a color-plus-clear composite coating.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings.

There is also a continuing desire to reduce the volatile organic content (VOC) of coating compositions. This must be done without sacrificing the rheological properties of the coating composition required for trouble-free application of the composition while maintaining the desired level of appearance. In addition, it is desirable to provide coatings with a good combination of properties such as durability, hardness, flexibility, and resistance to scratching, marring, solvents, and acids.

Curable coating compositions utilizing carbamate-functional resins are described in U.S. Pat. No. 5,356,669. These coating compositions can provide significant etch advantages over other coating compositions, such as hydroxy-functional acrylic/melamine coating compositions. It may often be desirable, however, to provide still further improvements in the above-described coating properties.

SUMMARY OF THE INVENTION

It has now been discovered that these objectives can be accomplished by incorporating low molecular weight compounds comprising at least one carbamate or urea group into such coating compositions. Thus, according to the present invention, there is provided a curable coating composition comprising (a) a polymer resin comprising carbamate functional groups, (b) a curing agent having groups that are reactive with said functional groups on (a), and (c) a compound having a molecular weight of from 75 to 2000 comprising at least one group of the formula:

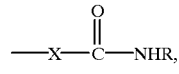

wherein X is O or NH, R is H or alkyl of 1 to 4 carbon atoms, and either (a), (b), or both (a) and (b) comprise groups that are reactive with said group on (c).

DESCRIPTION OF THE PREFERRED EMBODIMENTS

The polymer component (a) used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing the polymer (a) used in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as component (a) involves thermally decomposing urea (to give off ammonio and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

The polymer (a) will generally have a molecular weight of 2000–20,000, and preferably from 4000–6000. As used herein, molecular weight means number average molecular weight, and can be determined by the GPC method using a polystyrene standard. The carbamate content of the polymer, on a molecular weight per equivalent of carbamate functionality, will generally be between 200 and 1500, and preferably between 300 and 500. The glass transition temperature, $T_g$, of components (a) and (b) can be adjusted to achieve a cured coating having the $T_g$ for the particular application involved.

The polymer component (a) can be represented by the randomly repeating units according to the following formula:

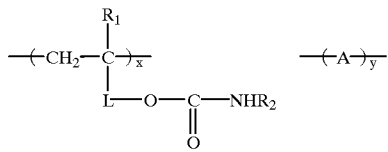

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

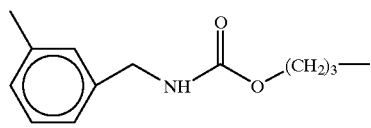

$—(CH_2)—$, $—(CH_2)_2—$, $—(CH_2)_4—$, and the like. In one preferred embodiment, —L— is represented by —COO—L'— where L' is a divalent linking group. Thus, in a preferred embodiment of the invention, the polymer component (a) is represented by randomly repeating units according to the following formula:

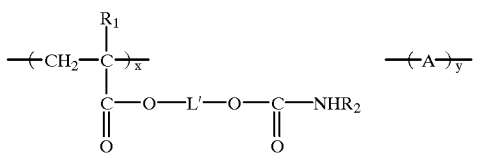

In this formula, $R_1$, $R_2$, A, x, and y are as defined above. L' may be a divalent aliphatic linking group, preferably of 1 to 8 carbon atoms, e.g., $—(CH_2)—$, $—(CH_2)_2—$, $—(CH_2)_4—$, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

The composition of the invention is cured by a reaction of the carbamate-functional polymer component (a) with a component (b) that is a compound having a plurality of functional groups that are reactive with the carbamate groups on component (a). Such reactive groups include active methylol or methylalkoxy groups on aminoplast crosslinking agents or on other compounds such as phenol/formaldehyde adducts, siloxane groups, and anhydride groups. Examples of (b) compounds include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred.

The compounds useful as component (c) according to the invention can be prepared in a variety of ways. Simple commercially-available carbamate or urea compounds such as butyl carbamate, hydroxypropyl carbamate, hydroxybutyl carbamate, or hydroxyethylethyl urea may be used in the present invention as component (c). However, it may often be desirable to avoid the inclusion of hydroxyl groups, as they may lead to the formation of vulnerable ether bridges during cure. The carbamate may be primary terminating in an —$NH_2$ group, or it may be secondary terminating in an NHR group. In a preferred embodiment, the carbamate is primary. One way to prepare compounds useful as component (c) is to react an alcohol ('alcohol' is defined herein as having one or more OH groups) with one or more ureas to form a compound with secondary carbamate group(s) (i.e., N-alkyl carbamates). This reaction is accomplished by heating a mixture of the alcohol and urea(s). Another technique is the reaction of an alcohol with a monoisocyanate (e.g., methyl isocyanate) to form a compound with secondary carbamate group(s) or with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of an alcohol with phosgene and then a primary amine to form a compound having secondary carbamate group(s). Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful as component (c) according to the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

The compound (c) will generally have a molecular weight of 75–2000, and preferably from 75–1500. The glass transition temperature, $T_g$, of components (a), (b), and (c) can be adjusted to achieve a cured coating having the $T_g$ for the particular application involved. The compound (c) is preferably used at levels between 3 to 50 percent (based on total resin solids of the coating composition), and more preferably between 5 to 25 percent.

As described above, the compound (c) has at least one goup according to the formula:

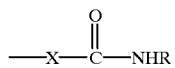

wherein X is S or O, and R is H or alkyl of 1 to 4 carbon atoms. Preferably, R is H or methyl, and more preferably R is H.

The compound (c) will generally have a molecular weight of 75–2000, and preferably from 75–1500. The glass transition temperature, $T_g$, of components (a), (b), and (c) can be adjusted to achieve a cured coating having the $T_g$ for the particular application involved. The compound (c) is preferably used at levels between 3 to 50 percent (based on total resin solids of the coating composition), and more preferably between 5 to 25 percent.

According to the present invention, component (a), component (b), or both components (a) and (b) must have at least one group thereon that is reactive with the carbamate group(s) on component (c). This is preferably accomplished through the selection of an aminoplast as component (b). Depending on the cure conditions, other compounds identified above as component (b) may also be reactive with the carbamate group(s) on component (c). Component (a) may also contain groups that are reactive with carbamate, such as an acrylic polymer containing isobutoxymethyl acrylamide groups.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the carbamate-functional compound (a) as well as the component (b). In general, depending on the solubility characteristics of components (a) and (b), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The coating composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A and B (i.e., a P:B ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The compounds (c) according to the present invention are reactive even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples.

PREPARATION 1

Beta Hydroxy Carbamate Functional Acrylic Resin

A three neck flask was fitted with a condensor, stirrer and thermocouple. The reactor was then loaded with 995.3 grams of PM acetate Arcosolve®. The solvent was then blanketed with nitrogen and heated to reflux (141–142)° C. slowly. At the same time, the following monomers were changed to the monomer additior tank.

| Monomer description | Weight in grams |
|---|---|
| methacrylate carbonate | 663.4 |
| styrene | 256.2 |
| acrylate 2-ethyl hexyl | 592.6 |
| methacrylate methyl | 134.9 |

After all the components were added to the initiator tank, the solution was mixed thoroughly and kept under agitation during the addition. 131.7 grams of Vazo® 67 was charged to the reactor. When the solvent in the reactor reached reflux the addition of the monomer feed was begun with simultaneous addition of the initiator over a four hour duration maintaining an even addition rate and reflux temperature. After the addition of the monomers and initiator was complete, the reaction was held for thirty minutes. After this hold, 24.7 grams of Vazo® 67 was added over a period of thirty minutes followed by solvent flush consisting of 77.6 grams of PM acetate, and the reaction was held for another thirty minutes. After this hold period, the mixture was brought to room temperature, then charged with 863.0 grams of methanol. The reaction set-up was changed from a heating mantle to a water bath. After the reaction vessel was placed in the water bath, the temperature was cooled by adding dry ice to the water bath. The temperature of the reaction mixture was brought down to 15° C., and then a slow addition of ammonia gas into the liquid phase reaction was begun. The reaction should was not allowed to exceed a temperature of 50° C. When all of the carbonate functionality was converted to carbamate, the reaction was complete. The methanol was removed from the reaction by vacuum strip.

PREPARATION 2

Carbamate Functional Acrylic Resin

A three neck round bottom flask was fitted with a condensor, stirrer and thermocouple. This reaction flask "A" was charged with 139 grams of 1-methyl-2-propanol. The solvent in "A" was blanketed with nitrogen and heated slowly with agitation to reflux 120° C. To a second container "B" was added 200 grams of 1-methyl-2-propanol and 11 grams of 4-methoxyphenol (MEHQ). This was heated to 50° C. where 243.5 grams of carbamate monomer was added incrementally maintaining a temperature of 50° C. This mixture was stirred and held at 50° C. until it was totally dissolved. Once all of the carbamate acrylic monomer was dissolved the mixture is maintained at 50° C. To this mixture (at 50° C.) was added a blend of acrylic monomers consisting of 198.6 grams 2-ethylhexyl acrylate (1.077 mol), 128.1 grams styrene (0.842 mol), 70.5 grams 2-ethylhexyl methacrylate (0.356 mol) and 106.6 grams of 50% active tert-butyl peracetate. The mixture in container "B" was then added to the reaction flask "A" over a four hour period maintaining a temperature between (123–125)° C. Once all of mixture "B" was charged, an additional solution of 10.7 grams tert-butyl peracetate and 20.0 grams of aromatic 100 was added over thirty minutes maintaining the temperature between (123–124)° C. The reaction mixture was then held at (123–124)° C. for 2.5 hours where the reaction was complete.

EXAMPLE 1

The clearcoat formulation was prepared by adding the following ingredients in order under agitation. After all the components were added and mixed thoroughly, the paint was filtered into a container for later use.

| | Ingredients | Parts by weight |
|---|---|---|
| 1. | Carbamate functional acrylic resin see Preparation 1. | 255.4 |
| 2. | Hydroxy propylcarbamate | 35.7 |
| 3. | Melamine x-linker Resimene ® 747 | 46.8 |
| 4. | Tinuvin ® 123 N-alkoxy hinered amine | 10.4 |
| 5. | Tinuvin ® 384B UVA light stabilizer | 6.6 |
| 6. | Nacure ® xp-243 blocked acid catalyst | 6.5 |
| 7. | Exxate ® 600 high-boiling alkyl acetates of primary alcohols | 103.2 |

EXAMPLE 2

The clearcoat formulation was prepared by adding the following ingredients in order under agitation. After all the components are added and mixture thoroughly the paint is filtered into a container for later use.

| | Ingredients | Parts by weight |
|---|---|---|
| 1. | Carbamate functional acrylic resin see Preparation 2. | 300.0 |
| 2. | Hydroxy propylcarbamate | 46.3 |
| 3. | Melamine x-linker Resimene ® 303 | 59.6 |
| 4. | Tinuvin ® 384B UVA light stabilizer | 10.0 |
| 5. | Tinuvin ® 123 N-alkoxy hindered amine | 3.2 |
| 6. | Nacure ® 5225 blocked acid catalysts | 6.3 |
| 7. | Exxate 800 high-boiling alkyl acetates of primary alcohols. | 30.0 |

EXAMPLE 3

The clearcoat formulation was prepared by adding the following ingredients in order under agitation. After all the components were added and mixed thoroughly, the paint was filtered into a container for later use.

| | Ingredients | Parts by weight |
|---|---|---|
| 1. | Carbamate functional acrylic resin see Preparation 2. | 300.0 |
| 2. | Hydroxy propylcarbamate | 46.3 |
| 3. | Melamine x-linker Resimene ® 303 | 89.6 |
| 4. | Tinuvin ® 384B UVA light stabilizer | 10.9 |
| 5. | Tinuvin ® 123 N-alkoxy hindered amine | 3.5 |
| 6. | Nacure ® 5225 blocked acid catalyst | 6.9 |
| 7. | Exxate ® 800 high-boiling alkyl acetates of primary alcohols | 30.0 |
| 8. | N-butyl alcohol/normal butanol | 110.0 |

EXAMPLE 4

The clearcoat formulation was prepared by adding the following ingredients in order under agitation. After all the components were added and mixed thoroughly, the paint was filtered into a container for later use.

| | Ingredients | Parts by weight |
|---|---|---|
| 1. | Carbamate functional acrylic resin see Preparation 2. | 300. 0 |
| 2. | N-butyl hydroxypropylcarbamate | 45.5 |
| 3. | Melamine x-linker Cymel ® 303 | 59.6 |
| 4. | Tinuvin ® 384B UVA light stabilizer | 10.0 |
| 5. | Tinuvin ® 123 N-alkoxy hindered amine | 3.2 |
| 6. | Nacure ® 5225 blocked acid catalyst | 6.3 |
| 7. | N-butyl alcohol/normal butanol | 110.0 |
| 8. | Exxate ® 800 high-boiling alkyl acetates of primary alcohols | 30.0 |

EXAMPLE 5

The clearcoat formulation was prepared by adding the following ingredients in order under agitation. After all the components were added and mixed thoroughly, the paint was red into a container for later use.

| | Ingredients | Parts by weight |
|---|---|---|
| 1. | Carbamate functional acrylic resin see Preparation 2 | 300.0 |
| 2. | N-butyl hydroxypropylcarbamate | 91.1 |
| 3. | Melamine x-linker Cymel ® 303 | 89.4 |
| 4. | Tinuvin ® 384B UVA light stabilizer | 12.4 |
| 5. | Tinuvin ® 123 N-alkoxy hindered amine | 3.9 |
| 6. | Nacure ® 5225 blocked acid catalysts | 7.8 |
| 7. | N-butyl alcohol/normal butanol | 110.0 |
| 8. | Exxate ® 800 high-boiling alkyl acetates of primary alcohols | 30.0 |

EXAMPLE 6

| | Ingredients | Parts by weight |
|---|---|---|
| 1. | Carbamate functional acrylic resin see Preparation 2 | 300.0 |
| 2. | N-propal hydroxypropylcarbamate | 80.2 |
| 3. | Melamine x-linker Cymel ® 303. | 59.6 |
| 4. | Tinuvin 384B UVA light stabilizer | 11.1 |
| 5. | Tinuvin ® 123 N-alkoxy hindered amine | 3.5 |
| 6. | Nacure ® 5225 blocked acid catalysts | 7.0 |
| 7. | N-butyl alcohol/normal butanol | 110.0 |
| 8. | Exxate ® 800 high-boiling alkyl acetates of primary alcohols | 30.0 |

The clearcoat formulation was prepared by adding the following ingredients in order under agitation. After all the components were added and mixed thoroughly, the paint was filtered into a container for later use

EXAMPLE 7

The clearcoat formulation was prepared by adding the following ingredients in order under agitation. After all the components were added and mixed thoroughly the paint was filtered into a container for later use.

| | Ingredients | Parts by weight |
|---|---|---|
| 1. | Carbamate functional acrylic resin see Preparation 2. | 300.0 |
| 2. | Fully carbamate modified melamine as described in U.S. Pat. No. 5,006,653 | 82.4 |
| 3. | N-butyl hydroxypropylcarbamate | 91.1 |
| 4. | Melamine x-linker Cymel ® 303 | 59.6 |
| 5. | Tinuvin ® 384B UVA light stabilizer | 13.4 |
| 6. | Tinuvin ® 123 N-alkoxy hindered amine | 4.3 |
| 7. | Nacure ® 5225 blocked acid catalysts | 8.5 |
| 8. | N-butyl alcohol/normal butanol | 110.0 |
| 9. | Exxate ® 800 high-boiling alkyl acetates of primary alcohols | 30.0 |

The above coating compositions were sprayed onto primed steel panels as clearcoats of a composite color-plus-clear coating along with a black basecoat utilizing a hydroxy-functional acrylic with a melamine crosslinker. The panels were cured at 270–280° F., and evaluated for acid spot, solvent resistance, and environmental etch.

Acid spot was evaluated on a scale of 1–60 with 1 being best and 60 being worst. A series of strong acid, bases and organic compositions were repared at standard solution. These compositions were applied drop wise to each panel (approximately three drops from a pipette) and heated, first 20 minutes at 120° F. then 30 minutes at 120° F. The panels were then washed of excess test solution and rated.

Solvent resistance (S.R.) was evaluated on a scale of 0–5 with 5 being best and 0 being worst. The procedure for running the test consists of the following steps. First, four layers of cheesecloth were placed on the end of a ball hammer held in place with rubber bands. Second, the clothed end was dipped into methylethyl ketone (MEK) and placed on the panel. Third, using back and fourth motion as one double rub rub, fifty double rubs were made over the panel in the same place. Fourth, after fifty counts, the panels were rated.

| Rating | Appearance |
|---|---|
| 0 | Through to basecoat |
| 1 | Severe scratching |
| 2 | Moderate Scratching |
| 3 | Slight scratching |
| 4 | Very little to no Scratching |
| 5 | No visible Scratching |

The panels were evaluated for environmental etch after being exposed to the elements at one of the automotive OEM etch evaluation sites at Jacksonville, Fla. Etch was rated on a scale of 1–10 with 1 being best and 10 being worst. A "+" was given to the rating to designate that the coating system was so bad that it could not be rated on the same scale.

| Rating | Description |
|---|---|
| 1–3 | Etch is not noticeable to observation on a clear sunny day. |
| 4–6 | Etch is only noticeable to a person trained at observing defect. |
| 7–9 | Etch is noticeable to a person not trained at observing defect. |
| 10 | Etch is extremely noticeable. |
| 10+ | System is a total failure toward etch testing. |

| ETCH Data | | | | | | | |
|---|---|---|---|---|---|---|---|
| Example | 2 Wk | 4 Wk | 8 Wk | 10 Wk | 14 Wk | S.R. | Acid Spot |
| 1 | 2 | 2 | 7 | | 7 | 4 | 10 |
| 2 | 2 | 6 | | 5 | | 4 | |
| 3 | 2 | 6 | | 6 | | 5 | |
| 4 | 1 | 3 | | 3 | | 4 | |
| 5 | 1 | 3 | | 4 | | 4 | |
| 6 | 2 | 3 | | 4 | | 4 | |
| 7 | 2 | 6 | | 3 | | 4 | |

EXAMPLE 8

The clearcoat formulation was prepared by adding the following ingredients in order under agitation. After all the components are added and mixed thoroughly the paint is filtered into a container for later use.

| | Ingredients | Parts by weight |
|---|---|---|
| 1. | Carbamate functional acrylic resin see Preparation 2 | 200.0 |
| 2. | Reaction product of isocyanurate of IPDI with 2 equiv. hydroxypropyl carbamate as described in U.S. Pat. No. 5,336,566 | 133.5 |
| 3. | Melamine x-linker | 35.0 |
| 4. | Tinuvin 384B UVA light stabilizer | 7.8 |
| 5. | Tinuvin ® 123 N-alkoxy hindered amine | 2.4 |
| 6. | Nacure ® 5225 blocked acid catalysts | 4.6 |
| 7. | isobutanol | 75.0 |
| 8. | Exxate ® 800 high-boiling alkyl acetates of primary alcohols | 50.0 |

The clearcoat formulation was prepared by adding the following ingredients in order under agitation. After all the components were added and mixed thoroughly, the paint was filtered into a container for later use

EXAMPLE 9

The clearcoat formulation was prepared by adding the following ingredients in order under agitation. After all the components are added and mixed thoroughly the paint is filtered into a container for later use.

| | Ingredients | Parts by weight |
|---|---|---|
| 1. | Carbamate functional acrylic resin see Preparation 2 | 200.0 |
| 2. | Reaction product of isocyanurate of T-1890 ® IPDI with hydroxypropyl carbamate as described in U.S. Pat. No. 5,336,566 | 135.0 |
| 3. | Melamine x-linker | 35.0 |
| 4. | Tinuvin 384B UVA light stabilizer | 7.8 |
| 5. | Tinuvin ® 123 N-alkoxy hindered amine | 2.4 |
| 6. | Nacure ® 5225 blocked acid catalysts | 4.6 |
| 7. | n-butanol | 75.0 |
| 8. | Exxate ® 800 high-boiling alkyl acetates of primary alcohols | 75.0 |

The clearcoat formulation was prepared by adding the following ingredients in order under agitation. After all the components were added and mixed thoroughly, the paint was filtered into a container for later use

EXAMPLE 10

The clearcoat formulation was prepared by adding the following ingredients in order under agitation. After all the components are added and mixed thoroughly the paint is filtered into a container for later use.

| | Ingredients | Parts by weight |
|---|---|---|
| 1. | Carbamate functional acrylic resin see Preparation 2 | 250.0 |
| 2. | Reaction product of isocyanurate of N-3300 ® IPDI with hydroxypropyl carbamate as described in U.S. Pat. No. 5,336,566 | 59.0 |
| 3. | Melamine x-linker | 30.0 |
| 4. | Tinuvin 384B UVA light stabilizer | 6.7 |
| 5. | Tinuvin ® 123 N-alkoxy hindered amine | 2.4 |
| 6. | Nacure ® 5225 blocked acid catalysts | 4.2 |
| 7. | n-butanol | 100.0 |
| 8. | Exxate ® 800 high-boiling alkyl acetates of primary alcohols | 75.0 |

The clearcoat formulation was prepared by adding the following ingredients in order under agitation. After all the components were added and mixed thoroughly, the paint was filtered into a container for later use.

The above coating compositions of Examples 8–10 were sprayed onto primed steel panels as clearcoats of a composite color-plus-clear coating along with a black basecoat utilizing a hydroxy-functional acrylic with a melamine crosslinker. Comparison panels were sprayed with carbamate clearcoats that did not contain the IPDI/HPC carbamate additives. The panels were cured at temperatures indicated below, and evaluated for environmental etch as described above.

| Example | Bake | 2 Wk | 4 Wk | 8 Wk | 12 Wk | 14 Wk |
|---|---|---|---|---|---|---|
| Comparison | 20 × 280 | 1 | 1 | 2 | 6 | 7 |
| Comparison | 20 × 280 | 2 | 1 | 2 | 6 | 7 |
| 8 | 20 × 280 | 1 | 1 | 2 | 3 | 3 |
| 9 | 20 × 280 | 1 | 1 | 2 | 4 | 4 |
| 10 | 20 × 280 | 1 | 1 | 2 | 5 | 5 |

The above data demonstrates a substantial improvement in etch resulting from the inclusion of the carbamate additives according to the invention.

The invention has been described in detail with reference to preferred embodiments thereof. It should be understood, however, that variations and modifications can be made within the spirit and scope of the invention.

What is claimed is:

1. A curable coating composition comprising
   (a) a polymer resin having a number average molecular weight of from more than 2000 to 20,000 comprising primary carbamate functional groups,
   (b) a curing agent having groups that are reactive with said functional groups on (a), and
   (c) a component (c) having at least one group of the formula

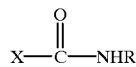

wherein X is O or NH, and R is H or alkyl of 1 to 4 carbons, said component (c) consisting of one or more carbamate compounds having at least one group of the formula

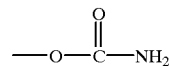

and each compound having a number average molecular weight of from 75 to 2000, and either (a), (b), or both (a) and (b) comprise groups that are reactive with said group on (c).

2. A curable coating composition according to claim 1 wherein component (c) has a molecular weight of from 75 to 1500.

3. A curable coating composition according to claim 1 wherein the compound (c) is a hydroxyalkyl mono or polycarbamate.

4. A curable coating composition according to claim 1 wherein R is H or methyl.

5. A curable coating composition according to claim 1 wherein R is H.

6. A curable coating composition according to claim 1 wherein the curing agent (b) is an aminoplast.

7. A curable coating composition according to claim 6 wherein the aminoplast is a melamine formaldehyde resin.

8. A curable coating composition according to claim 1 wherein the compound (c) is present at 3–50 weight percent of total resin solids in the coating composition.

9. A curable coating composition according to claim 1 wherein the polymer resin (a) is an acrylate or methacrylate polymer.

10. A curable coating composition according to claim 1 wherein the compound (c) comprises a single carbamate group.

11. A curable coating composition according to claim 1 wherein the compound (c) comprises at least 2 carbamate groups.

12. A curable coating composition according to claim 1 wherein components (a), (b), and (c) are dispersed in an organic solvent medium.

13. A curable coating composition according to claim 1 wherein components (a), (b), and (c) are dispersed in an aqueous medium.

14. A curable coating composition according to claim 1 wherein components (a), (b), and (c) are in the form of a powder.

15. A curable coating composition according to claim 1, further comprising from 0.5 to 0.75% of a blocked acid cure catalyst.

16. A curable coating composition according to claim 1 wherein X is O.

17. A curable coating composition according to claim 1 wherein X is NH.

18. The curable coating composition of claim 1 wherein compound (c) comprises the reaction product of an isocyanate and a carbamate functional compound.

19. The curable coating composition of claim 18 wherein compound (c) comprises the reaction product of a carbamate functional compound and an isocyanurate of an isocyanate.

20. The curable coating composition of claim 19 wherein compound (c) comprises the reaction product of an isocyanurate of IPDI and hydroxypropyl carbamate.

21. A curable coating composition comprising
   (a) a polymer resin having a number average molecular weight of from more than 2000 to 20,000 comprising carbamate functional groups,
   (b) a curing agent having groups that are reactive with said functional groups on (a), and (c) a compound comprising the reaction product of a carbamate functional compound and an isocyanate, having a number average molecular weight of from 75 to 2000 and comprising at least one group of the formula:

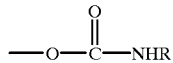

wherein R is H or alkyl of 1 to 4 carbon atoms, and either (a), (b), or both (a) and (b) comprise groups that are reactive with said group on (c).

22. The curable coating composition of claim 21 wherein compound (c) comprises the reaction product of a carbamate functional compound and an isocyanurate of an isocyanate.

23. The curable coating composition of claim 22 wherein compound (c) comprises at least three groups of the formula:

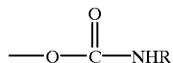

wherein R is H or alkyl of 1 to 4 carbon atoms.

24. A curable coating composition comprising (a) a polymer resin having a number average molecular weight of from more than 2000 to 20,000 comprising primary carbamate functional groups, (b) a curing agent having groups that are reactive with said functional groups on (a), and (c) from 3 to 50 weight percent, based on total resin solids of the coating composition, of a component (c) having at least one group of the formula

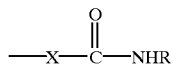

wherein X is O or NH, and R is H or alkyl of 1 to 4 carbon atoms, said component (c) consisting of one or more carbamate compounds having at least one group of the formula

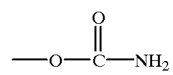

and each compound having a number average molecular weight of from 75 to 2000 and either (a), (b), or both (a) and (b) comprise groups that are reactive with said group on (c).

25. A curable coating composition comprising (a) a polymer resin having a number average molecular weight of from more than 2000 to 20,000 comprising carbamate functional groups, (b) a curing agent having groups that are reactive with said functional groups on (a), and (c) a component (c) having at least one group of the formula

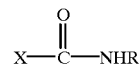

wherein X is O or NH, and R is H or alkyl of 1 to 4 carbons, said component (c) consisting of one or more carbamate compounds having at least two groups of the formula

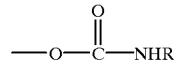

wherein R is H or alkyl of 1 to 4 carbon atoms, and each compound having a number average molecular weight of from 75 to 20000, and either (a), (b), or both (a) and (b) comprise groups that are reactive with said group on (c).

26. A method of coating a substrate comprising the steps of:

(1) applying to the substrate a coating composition comprising (a) a polymer resin having a number average molecular weight of from more than 2000 to 20,000 comprising primary carbamate functional groups, (b) a curing agent having groups that are reactive with said functional groups on (a), and (c) a component (c) having at least one group of the formula

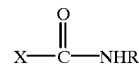

wherein X is O or NH, and R is H or alkyl of 1 to 4 carbons, said component (c) consisting of one or more carbamate compounds having at least one group of the formula

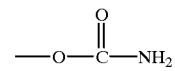

and each compound having a number average molecular weight of from 75 to 2000, and either (a), (b), or both (a) and (b) comprise groups that are reactive with said group on (c), and (2) curing the coating composition.

27. A method according to claim 26 wherein said coating composition further comprises from a blocked acid cure catalyst and said temperature is between 115° C. and 150° C.

28. A coated article comprising a substrate and a coating derived from a coating composition comprising (a) a polymer resin having a number average molecular weight of from more than 2000 to 20,000 comprising primary carbamate functional groups, (b) a curing agent having groups that are reactive with said functional groups on (a), and (c) a component (c) having at least one group of the formula

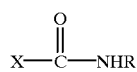

wherein X is O or NH, and R is H or alkyl of 1 to 4 carbons, said component (c) consisting of one or more carbamate compounds having at least one group of the formula

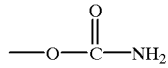

and each compound having a number average molecular weight of from 75 to 20000, and either (a), (b), or both (a) and (b) comprise groups that are reactive with said group on (c).

29. A coating according to claim 28 having a 20° gloss, as defined by ASTM D523-89, of at least 80.

30. A coating according to claim 29 having a DOI, as defined by ASTM E430-91, of at least 80.

31. A composite comprising a substrate and a color-plus-clear coating wherein the clear coating is derived from a coating composition comprising (a) a polymer resin having a number average molecular weight of from more than 2000 to 20,000 comprising primary carbamate functional groups, (b) a curing agent having groups that are reactive with said functional groups on (a), and (c) a component (c) having at least one group of the formula

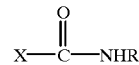

wherein X is O or NH and R is H or alkyl of 1 to 4 carbons, said component (c) consisting of one or more carbamate compounds having at least one group of the formula

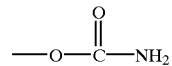

and each compound having a number average molecular weight of from 75 to 2000, and either (a), (b), or both (a) and (b) comprise groups that are reactive with said group on (c).

* * * * *